United States Patent Office 3,367,994
Patented Feb. 6, 1968

3,367,994
NOVEL ACCELERATOR FOR UNSATURATED POLYESTER RESINS
Earl E. Parker, Allison Park, and Bela Udvarnoki, Jr., Cheswick, Pa., assignors to Pittsburgh Plate Glass Company, Pittsburgh, Pa., a corporation of Pennsylvania
No Drawing. Filed July 20, 1965, Ser. No. 473,489
10 Claims. (Cl. 260—864)

This invention relates to methods of accelerating the cure of polymerizable mixtures of (A) a polyester of an alpha, beta-ethylenically unsaturated dicarboxylic acid and a polyhydric alcohol and (B) a polymerizable ethylenically unsaturated compound. More particularly, this invention relates to the use of N-alkyl-N-hydroxyalkyl-alkyl anilines as accelerators for inhibited unsaturated polyester resins.

Unsaturated polyester resins have extensive commercial utility. Commercial requirements demand that such resins cure rapidly to a hard, heat-resistant state, but that the uncatalyzed liquid mixture of polyester and monomer be stable for storage for long periods of time. To achieve the desired storage-stability, it is common practice to add inhibitors to the liquid mixture of the unsaturated polyester and unsaturated monomer. Ordinarily, however, these inhibitors adversely affect the curing of the unsaturated resins, rendering a polymerization accelerator necessary in addition to a polymerization catalyst. The accelerators are generally added to the inhibited unsaturated polyester-monomer mixture and frequently detract from the storage-stability of the unsaturated polyester resin. Conventionally, those accelerators which have the greatest effect in promoting the rapid curing of the unsaturated polyester are more detrimental to the shelf life of the polyester.

However, it has now been discovered that N-alkyl-N-hydroxyalkyl-alkylaniline compounds accelerate the cure of catalyzed unsaturated polyester-monomer mixtures without unduly affecting the storage-stability of uncatalyzed polyester resins. The novel accelerators which promote low temperature or elevated temperature curing of unsaturated polyester resins in the presence of a polymerization catalyst have the following general structure:

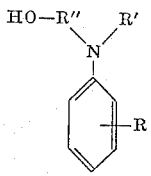

wherein R is a lower alkyl group, preferably methyl; R' is a lower alkyl group, preferably ethyl; and R" is an alkylene group of 2 to 10 carbon atoms, preferably ethylene. The term "lower alkyl" is used to indicate an alkyl group having about 1 to about 6 carbon atoms.

As mentioned above, unsaturated polyester resins are prepared by admixing polymerizable ethylenically unsaturated compounds and unsaturated polyesters which are the esterification product of alpha, beta-ethylenically unsaturated dicarboxylic acids and polyhydric alcohols. The ethylenically unsaturated dicarboxylic acid may include such acids as: maleic acid, fumaric acid, aconitic acid, mesaconic acid, citraconic acid, itaconic acid, and halo and alkyl derivatives of such acids, and the like, with maleic acid being preferred. The anhydrides of these acids, where the anhydrides exist, are, of course, embraced under the term "acid," since the reaction products produced therefrom, i.e., the polyesters, are the same.

The ethylenically unsaturated dicarboxylic acids are conventionally employed in an amount of about 10 mol percent to about 100 mol percent, although preferably in an amount of about 20 mol percent to about 80 mol percent, of the total mols of acid components in the polyester.

The polyhydric alcohols useful in preparing unsaturated polyester resins include: ethylene glycol, diethylene glycol, triethylene glycol, polyethylene glycol, propylene glycol, dipropylene glycol, butylene glycol, glycerol, neopentyl glycol, pentaerythritol, trimethylolpropane, trimethylolethane, and the like. The preferred polyhydric alcohols have a molecular weight of less than about 2000 and consist essentially of carbon, hydrogen and oxygen atoms.

The polyhydric alcohols can be employed in an equal molar ratio to the total acid components, although it is conventional practice to include a slight excess of the polyol, for example, about 5 mol percent.

Saturated dicarboxylic acids may be utilized in conjunction with the unsaturated acid in the preparation of unsaturated polyester resins. Such acids increase the length of the polyester without adding additional cross-linking sites, which may be a desired feature in some polyesters. Examples of useful dicarboxylic acids which are either saturated or only aromatically unsaturated include: succinic acid, adipic acid, suberic acid, azelaic acid, sebacic acid, phthalic acid, isophthalic acid, terephthalic acid, tetrachlorophthalic acid, hexachloroendomethylenetetrahydrophthalic acid, and the like. The anhydrides of these acids, where the anhydrides exist, are, of course, embraced in the term "acid," since the reaction products or polyesters are the same.

For purposes of the present invention, the aromatic nuclei of such acids as phthalic acid are regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. These saturated or aromatically unsaturated acids may also be defined as "nonolefinically unsaturated" polycarboxylic acids.

Polymerizable ethylenically unsaturated monomers which cross-link with unsaturated polyesters to form thermosetting materials include such monomers as styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, diallyl itaconate, diallyl maleate, diallyl fumerate, triallyl cyanurate, and the like. The preferred monomers are liquid compounds, soluble in the polyester component, particularly styrene and vinyl toluene. Such monomers should preferably be free of non-aromatic carbon-carbon conjugated double bonds, and should contain a single $CH_2=C<$ group.

The monomer component or components may be employed over a broad range, but usually the proportion thereof, upon a weight basis, will be less than the polyester component. The amount of monomer should be sufficient to provide a liquid, flowable, interpolymerizable mixture. Usually, the percentage of monomer will fall within the range of about 10 percent to about 60 percent by weight of the total mixture of polyester and monomer. At the preferred range, the monomer is utilized in an amount of about 20 percent to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100° C. to about 120° C., which is sufficiently high, in the absence of polymerization (gelation) inhibitors, to induce premature gelation upon introduction of the monomer into the system. This is true even in the absence of polymerization catalysts. Accordingly, it is preferred to include a gelation inhibitor to one or both components of the mixture. Suitable inhibitors may be selected from the quinonic or phenolic class or from a group of quaternary ammonium salts and salts of amines, particularly amine halide salts. Suitable inhibitors of the quinonic or phenolic class include: P-benzoquinone, chloranil, hydroquinone, 3-isopropyl catechol, 4-t-butyl catechol, 3-methyl catechol, 4-ethyl catechol, 4-isopropyl catechol, and the like.

The following are representative examples of halide salts of amines which may be employed as inhibitors: trimethylamine hydrochloride, triethylamine hydrochloride, trimethylamine hydrobromide, dimethylaniline hydrochloride, tri-n-butylamine hydrochloride, tribenzylamine hydrobromide, N-benzylaniline hydrochloride, and the like.

Useful quaternary ammonium salts include trimethylbenzyl ammonium chloride, trimethylbenzyl ammonium acid oxalate, di(trimethylbenzyl ammonium)oxalate, trimethylbenzyl ammonium maleate, trimethylbenzyl ammonium tartrate, choline chloride, and the like. Other useful quaternary ammonium compounds and amine halides are disclosed in U.S. Patents Nos. 2,593,787 and 2,646,416, respectively.

The gelation inhibitor remains in the solution of unsaturated polyester-interpolymerizable monomer and acts as an inhibitor of gelation during subsequent storage of material before the latter is actually used. The amount of inhibitor required in the mixture during the mixing stage is susceptible to wide variation, but preferably is in a range of about 0.01 percent to about 0.1 percent by weight, based upon the polyester component of the mixture.

Interpolymerizable mixtures of polyesters of alpha, beta-ethylenically unsaturated dicarboxylic acids and monomers containing an inhibitor, as above described, may be stored over substantial periods of time, for example, several weeks or even months, without premature gelation.

When the interpolymerizable mixture is to be employed in the preparation of castings or laminates, or other products in accordance with the provisions of the present invention, there is employed a polymerization catalyst, conventionally a free-radical catalyst, which is an organic peroxide, organic hydroperoxide, or esters thereof, and which is activated by an accelerator. Typical organic peroxides useful as catalysts for unsaturated polyester resins include: benzoyl peroxide, acetyl peroxide, lauroyl peroxide, methyl ethyl ketone peroxide, cyclohexanone peroxide, and the like.

Organic hydroperoxides or their esters with carboxylic acids useful as catalysts for unsaturated polyester resins include: cumene hydroperoxide, tertiary butyl hydroperoxide, hydroxycyclohexyl hydroperoxide, p-menthane hydroperoxide, ditertiary butyl perphthalate, methyl ethyl ketone peroxide, 1-hydroxycyclohexyl hydroperoxide, and the like.

Many other useful catalysts thereof with carboxylic acids are disclosed in the monograph entitled "Organic Peroxides" by A. V. Tovolsky and R. B. Mesrobian, copyrighted in 1954 by Interscience Publishers, Inc., New York, pages 158–163. These catalysts may be utilized in amounts of about 0.1 percent to about 5 percent by weight based upon the mixture of interpolymerizable materials. Naturally, the amount of the organic peroxide catalyst applicable in the practice of the invention will vary with the activity of the particular accelerator and with the amount of inhibitor present in the interpolymerizable mixture. All of the organic free-radical compounds constitute catalysts of interpolymerization at elevated temperatures and are desirable in order to obtain a complete and thorough cure in the mixtures within reasonable periods of time and at reasonable temperatures.

For a thorough discussion of unsaturated polyester resin preparation, raw materials therefor, and appropriate polymerization catalysts, inhibitors, accelerators, and the like, see "Polyesters and Their Applications" by Bjorksten, Reinhold Publishing Corporation (1956), especially pages 21–73.

As disclosed hereinabove, accelerators are commonly used to promote the free-radical catalyzed reaction of inhibited unsaturated polyester resin systems. Typical accelerators include tertiary amines of various types and conventionally it has been found that the greater the accelerating effects of a particular compound, the greater its detrimental effect upon the storage-stability of inhibited polyester resins containing such a compound. Thus, the instant invention is particularly advantageous inasmuch as the tertiary amine accelerators of this invention, which are derivatives of hydroxyl alkyl anilines, promote fast curing of free-radical catalyzed inhibited polyester systems without unduly adverse effect upon storage-stability. For example, one of the novel accelerators of this invention, N-ethyl-N-hydroxyethyl-m-methyl aniline, possesses the rapid accelerating effect of dimethyl aniline, a very strong accelerator, and the minimal effect upon storage-stability of diethyl aniline, a relatively weak accelerator.

The hydroxyalkyl amine accelerators of this invention have a reasonable degree of solubility in the interpolymerizable mixture and are defined by the following structure:

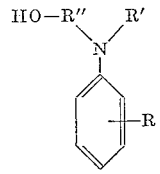

wherein R is a lower alkyl group, R' is a lower alkyl group and R'' is an alkylene group of 2 to 10 carbon atoms.

The preferred class of compounds for the purposes of the invention comprise those compounds embraced by the above structure wherein R' is ethyl, R'' is ethylene, and R is a lower alkyl group, especially when R is attached to the meta-carbon atom.

The following constitutes a partial list of tertiary amine accelerators useful within the scope of the instant invention:

N-ethyl-N-hydroxyethyl-m-methylaniline
N-propyl-N-hydroxyethyl-m-methylaniline
N-butyl-N-hydroxyethyl-m-methylaniline
N-ethyl-N-hydroxyethyl-o-methylaniline
N-ethyl-N-hydroxyethyl-p-methylaniline
N-ethyl-N-hydroxyethyl-m-ethylaniline
N-propyl-N-hydroxyethyl-o-ethylaniline
N-butyl-N-hydroxyethyl-p-ethylaniline
N-methyl-N-hydroxypropyl-m-ethylaniline
N-ethyl-N-hydroxybutyl-o-ethylaniline
N-butyl-N-hydroxybutyl-m-butylaniline
N-propyl-N-hydroxybutyl-p-butylaniline
N-ethyl-N-hydroxypropyl-o-butylaniline and the like.

Amounts of such accelerators employed in unsaturated polyester resins are susceptible to variations over a relatively broad range. However, there is usually a concentration of accelerator in which the rate of cure is optimum. If the amount of accelerator is either increased or decreased, and the mixture contains a peroxidic catalyst, the rate of cure of the mixture tends to become slower. The rate of cure can thus be tailored to meet requirements of specific cases. Where very fast rates of cure are desired, the amount of accelerator should be adjusted to obtain the fastest cure. Where slower rates of cure are desired, the amount of accelerator can either be increased or decreased to meet requirements. In general, the percentage of the accelerator should fall within a range of about 0.01 percent to about 2 percent by weight, based upon the weight of the total mixture. In the majority of instances, the preferred amount is an amount of about 0.3 percent to the total weight of the mixture.

The novel accelerator system of this invention may be utilized with any combination of inhibitors, catalysts and the like, conventionally included in polymerizable unsaturated polyester resins which are to be cured to a thermoset condition. It is preferred, however, to utilize these accelerators with catalysts of the organic peroxide-type with the best results being achieved with benzoyl peroxide.

The novel accelerators of this invention are particularly useful in unsaturated polyester resins formulated as body putties. Body putties are utilized in repair and maintenance of many types of articles, including automobiles, boats and similar metallic, plastic and wooden articles. Body putty resins are conventionally supplied as two-package systems, one package containing the inhibited unsaturated polyester resin, accelerator and filler; the other package containing catalyst. Appropriate fillers include talc, asbestos, silicates, carbonates, clays, glass fibers, nylon fibers, and the like, said fillers being used in considerable quantity in body putty formulations, for example, from about 25 percent to about 200 percent by weight of the resins. The desired characteristics of a good putty resin are that it remain workable for a certain period after the packages have been intimately admixed, but that as it begins to harden, it attains the hard, cured condition in a relatively short period. The hard, cured condition is desired to be achieved quickly inasmuch as the resin is subjected to sanding before application of paint or other coating materials. Thus, precious time may be lost if the resin remains too soft for sanding over an extended period of time. Additionally, the novel accelerators of this invention are particularly suitable for body putty formulations which are frequently stored for long periods of time, inasmuch as they may be included in the inhibited polyester resin at the time of manufacture without unduly shortening the shelf-life thereof.

The following examples illustrate in detail the method of practicing the instant invention. The examples are not intended to limit the invention, however, for there are, of course, numerous possible variations and modifications.

In the examples, the following unsaturated polyester resins are utilized:

Polyester A:
    Unsaturated polyester having an acid number of about 46 and being prepared by the reaction of 5 moles maleic anhydride, 5 moles phthalic anhydride, and 10.7 moles propylene glycol _____ 65.0
    Styrene _____ 35.0
    Hydroquinone _____ 0.015

Polyester B:
    Unsaturated polyester component (same as in Polyester A) _____ 65.0
    Styrene _____ 35.0
    Hydroquinone _____ 0.01
    Trimethylbenzyl ammonium chloride _____ 0.17

In the examples, N-ethyl-N-hydroxyethyl-m-methyl-aniline is referred to as EHMA.

In the following examples, the "gel time" defines the time required for the resin to gel after the addition of catalyst. The "storage-stability" refers to the time that the uncatalyzed resin remains in liquid form; i.e., before gel formation. As stated above, even uncatalyzed unsaturated polyester resins tend to gel upon storage, especially at elevated temperatures, and the addition of an accelerator tends to shorten storage-stability of said resins.

Example I

To determine the effect of N-ethyl-N-hydroxyethyl-m-methylaniline (EHMA) as an accelerator for unsaturated polyester resins, it was compared with dimethylaniline (DMA) and diethylaniline (DEA) in Polyester B, which had been catalyzed by the addition of 1 percent by weight of benzoyl peroxide.

| Test | Composition | Gel time at about 75° F. (min.) | Storage-Stability at 150° F. (days) |
| --- | --- | --- | --- |
| A | 100 parts Polyester B, 0.2 part DEA. | 55 | 3-4 |
| B | 100 parts Polyester B, 0.2 part EHMA. | 11.7 | 4-5 |
| C | 100 parts Polyester B, 0.2 part DMA. | 9.0 | <1 |

The unsaturated polyester containing EHMA as an accelerator gelled in substantially the same time as the resin containing DMA, a very strong accelerator. However, the EHMA-containing resin was four to five-fold more stable than the DMA resin.

Example II

A series of acceleration and stability tests were performed with Polyester A, containing 1 percent by weight benzoyl peroxide. An additional quantity of hydroquinone type inhibitor was added and the amine accelerators were included as 0.1 percent by weight of the resin formulation. The results are tabulated as follows:

| Test | Composition | Gel time at about 75° F. (min.) | Storage-Stability at 50° F. (days) |
| --- | --- | --- | --- |
| A | 100 parts Polyester A, 0.01 part hydroquinone type inhibitor, 0.1 part DEA. | 281 | 8-9 |
| B | 100 parts Polyester A, 0.01 part hydroquinone type inhibitor, 0.1 part EHMA. | 59 | 7-8 |
| C | 100 parts Polyester A, 0.01 part hydroquinone type inhibitor, 0.1 part DMA. | 44 | <1 |

It is significant that the EHMA accelerator gelled the unsaturated polyester resin in substantially the same length of time required by the very active accelerator, DMA, but evidenced approximately the same effect upon storage stability as the less active accelerator, DEA. This is particularly significant inasmuch as DMA, in the above formulation, was about seven-fold more effective as an accelerator than DEA, but caused the storage-stability to be about one-seventh or less that of the resin containing DEA. Thus, the accelerator such as EHMA, which combines the advantages of each of these other aminic accelerators is an important advance in the art.

Example III

The effect of various aminic accelerators was determined upon the following body putty resin:

Resin:
    70 parts polyester [1]
    30 parts styrene
    0.1 part of a 20 percent solution of copper naphthenate in styrene
    0.01 part quinone type inhibitor
    0.015 part hydroquinone type inhibitor
    0.06 part cobalt metal in form of a soluble cobalt salt

[1] Polyester had an acid number of about 40 and was the reaction product of 10.0 moles of diethylene glycol, 2.5 moles maleic anhydride, 6.5 moles phthalic anhydride and 2.0 moles benzoic acid.

The resin was admixed with 120 percent by weight of talc filler. The various amines were added to the filled resin according to the following table; however, the accelerator content is based upon the non-filled resin. Benzoyl peroxide was added as 1 percent of the weight of the filled resin.

| Accelerator | Gel Time at about 75° F. (min.) | Oven Stability at 158° F. (days) | Oven Stability at 150° F. (days) |
|---|---|---|---|
| 0.4% EHMA | 4.2 | 6-7 | 18 |
| 0.4% TDA [1] | 6.1 | 3-4 | 4-5 |
| 0.3% DMA | 9.8 | 3-4 | 5-6 |
| 0.4% DEA | 13.8 | 7-8 | 16 |

[1] TDA is m-tolyl diethanolamine.

The DMA accelerator was used in less quantity than the other accelerators because its adverse effect upon storage stability at high levels is well known. The EHMA accelerator produced the fastest gel time and the longest storage-stability.

When the above examples are repeated utilizing other unsaturated polyester resin compositions or other of the accelerators of the structure set forth hereinabove, substantially equivalent results are obtained. Good results are also obtained when these accelerators are used in combination with other inhibitors and catalysts. All of these modifications are included within the scope of the following claims.

We claim:

1. A rapidly polymerizable unsaturated polyester composition, having improved storage stability, comprising:
   (A) A liquid polymerizable, ethylenically unsaturated compound,
   (B) A polyester of a dihydric compound and an alpha,beta-ethylenically unsaturated acid, and
   (C) A compound of the structure:

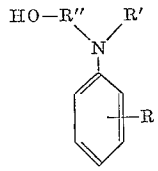

wherein R and R' are lower alkyl groups, and R" is an ethylene group.

2. The composition of claim 1 wherein component (C) is present in a polymerization accelerating amount.

3. The composition of claim 2 wherein component (C) is H-hydroxyethyl-N-ethyl-m-methylaniline.

4. The composition of claim 3 wherein component (A) is styrene.

5. A method for accelerating the free-radical polymerization of a composition comprising:
   (A) A liquid polymerizable, ethylenically unsaturated compound, and
   (B) A polyester of a dihydric compound and an alpha,beta-ethylenically unsaturated acid,
which comprises adding to said composition an accelerating quantity of a compound of the structure:

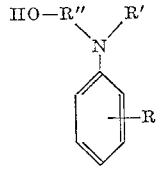

wherein R and R' are lower alkyl groups, and R" is an ethylene group, and carrying out the polymerization thereof in the presence of a free-radical polymerization catalyst.

6. The method of claim 5 wherein component (C) is N-hydroxyethyl-N-ethyl-m-methylaniline.

7. The method of claim 5 wherein component (A) is styrene.

8. A two-component body putty composition, one component of which is a free-radical polymerizable mixture having improved storage stability and which comprises:
   (A) A liquid polymerizable, ethylenically unsaturated compound,
   (B) A polyester of a dihydric compound and an alpha,beta-ethylenically unsaturated acid,
   (C) A gelation inhibitor,
   (D) Filler material, and
   (E) A compound of the structure:

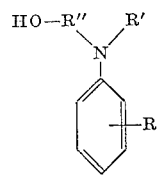

wherein R and R' are lower alkyl groups, and wherein R" is an ethylene group,
and the second component of which comprises a free-radical polymerization catalyst.

9. The composition of claim 8 wherein component (E) is N-hydroxyethyl-N-ethyl-m-methylaniline.

10. A method for accelerating the hardening, by means of free-radical polymerization, of a body putty composition comprising:
   (A) A liquid polymerizable, ethylenically unsaturated compound,
   (B) A polyester of a dihydric compound and an alpha, beta-ethylenically unsaturated acid, and
   (C) Filler material
which comprises adding to said composition an accelerating quantity of a compound of the structure:

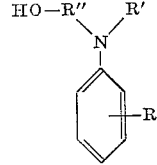

wherein R and R' are lower alkyl groups, and R" is an ethylene group, and carrying out the polymerization thereof in the presence of a free-radical polymerization catalyst.

References Cited

UNITED STATES PATENTS 2,558,139  6/1951  Knock et al. _____ 260—885

FOREIGN PATENTS 833,584  4/1960  Great Britain.
605,529  9/1960  Canada.

MURRAY TILLMAN, *Primary Examiner.*

J. T. GOOLKASIAN, *Assistant Examiner.*